June 8, 1943.    R. A. EHRHARDT ET AL    2,321,071
METHOD OF ASSEMBLING DRY RECTIFIERS
AND THE LIKE WITH SOLDER
Filed June 18, 1941
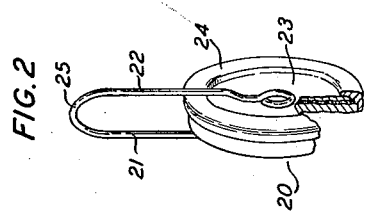
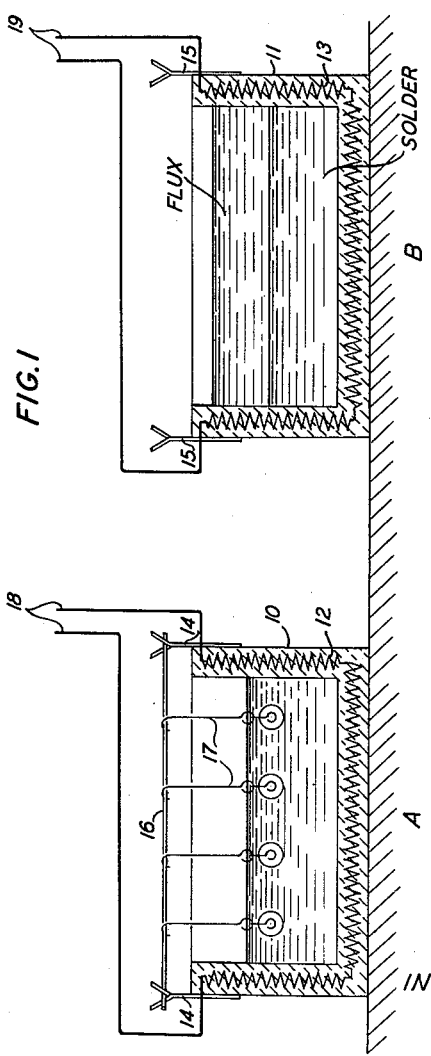
INVENTORS R. A. EHRHARDT
E. E. WRIGHT
BY
Walter C. Kiesel
ATTORNEY Patented June 8, 1943

2,321,071

UNITED STATES PATENT OFFICE 2,321,071

METHOD OF ASSEMBLING DRY RECTIFIERS AND THE LIKE WITH SOLDER

Robert A. Ehrhardt, New Providence, N. J., and Edgar E. Wright, Whitestone, N. Y., assignors to Bell Telephone Laboratories, Incorporated, New York, N. Y., a corporation of New York Application June 18, 1941, Serial No. 398,582

9 Claims. (Cl. 113—112)

This invention relates to electrically conductive devices such as metal oxide-metal rectifiers and the like. More particularly the invention involves the assembly of such devices by means of solder in a manner to avoid injury to the electrical properties thereof.

Metal oxide-metal rectifiers and similar electrical devices are usually assembled by means of bolts, enclosing housings and similar means. In many cases a simpler and less expensive structure could be made by soldering. However, the usual soldering temperatures are sufficiently high to cause injury to such devices. It has been proposed to employ a low melting point solder to overcome this difficulty. There still remains, however, a difficulty due to the soldering flux which tends to penetrate the more porous portions of the devices and cause injury thereto. Where the device is a metal oxide-metal rectifier, the rectifying junction may be short-circuited by this penetration. Attempts have been made to solder without fluxing but these have failed usually usually due to the lack of cleanliness of the surface.

It is an object therefore of the present invention to solder to metal oxide-metal rectifiers and similar electrical devices without injury to their electrical properties.

One feature of this invention resides in employing a soldering flux of very low concentration.

A further feature of this invention lies in the use of a combined fluxing and soldering bath.

In accordance with another feature of this invention, the devices to be soldered are subjected to a presoldering treatment that inhibits the deleterious effects of the soldering flux on the devices.

Another feature of this invention involves the use of a low melting point solder in connection with the foregoing features.

Other and further objects and features of the invention will be understood more fully and clearly from the following description of an illustrative embodiment thereof taken in connection with the appended drawing in which:

Fig. 1 shows one assembly of apparatus suitable for carrying out the process; and Fig. 2 shows a device prepared in one way for soldering by the process of this invention.

In Fig. 1 there is shown a presoldering station A and a fluxing and soldering station B. The treating baths at the stations may be held in containers 10 and 11, respectively. These containers may be of the double wall type with electrical heaters 12 and 13 between the inner and outer walls. The heaters may be connected to control means and a power source by conductors 18—18 and 19—19, respectively. Other suitable means such as circulating fluid, etc. may be employed for maintaining the baths at the desired temperature.

The two stations may be provided respectively with members 14 and 15 for supporting a bar 16 above each bath. The units to be processed may be suspended from the bar 16 by any suitable means, as hangers 17.

The bath at station A may be water, alcohol or any similar material that will penetrate any porous portions of the unit to be soldered without injury thereto. This bath should be maintained at about the soldering temperature.

The bath shown at station B comprises both flux and solder, the flux being ordinarily of a low density material floats on the surface of the solder. A suitable flux is a weak solution of an acid such as sulphuric or hydrochloric acid in water. Satisfactory results have been obtained with a 1 per cent solution of sulphuric acid. The solder may comprise Wood's metal, a similar bismuth alloy or some other metal or alloy melting below approximately 100° C. The fluxing and soldering bath may be maintained at the proper temperature by means of the heater 13 in connection with any suitable temperature control.

In Fig. 2 there is shown a single rectifier disc 20 assembled with wires 21 and 22, which are to be soldered to its respective faces to serve as terminals. The rectifier disc may be, for example, a cuprous oxide-copper unit with an adherent copper contact on the cuprous oxide surface. The edges of the unit should be masked as shown at 24 to prevent adherence of the solder thereto. The masking may be done with a varnish or lacquer that will not be affected by the flux or the solder. A lacquer made from a cellulose derivative is suitable. The mask shown is somewhat exaggerated as to thickness, for clarity of illustration.

The wires 21 and 22 may be temporarily secured to the disc faces by suitable clamping means. One way to do this is as shown in Fig. 2, i. e., use a U-shaped piece of wire bent at 25 and having arms 21 and 22, which may be clamped on the disc 20. This wire may be cut at 25 after soldering.

In preparation for processing, a plurality of units may be suspended on hangers 17 which are supported by bar 16. The units are first immersed in the bath at station A for a short time, i. e., one to three minutes. The units are then transferred to the bath at B by moving bar 16 from members 14 to members 15. The units are cleaned while passing through the flux layer and upon immersion in the solder all of the metal surfaces are coated with solder. Upon removal from this bath, the units may be rinsed in cold water and dried.

If found desirable or necessary, the parts may be coated with solder before assembly. However, it has been found that with many assemblies such as the one shown in Fig. 2 this is not necessary. Where the area of contact between the parts to be joined is small, the solder seeps between the parts sufficiently to insure a good joint.

Where it appears desirable to coat the various elements of a device with solder before assembly, each part that would be injured by ordinary soldering methods may be coated by the process of this invention and other parts by any convenient method. The parts may then be assembled and heated by any suitable method or means. For example, the assembly may be immersed in a hot water bath such as the presoldering bath at A in Fig. 1.

This process may also be carried out by using an intermediate fluxing step with the flux in a separate container from the solder. In this case the solder should be applied before the cleanliness due to the fluxing has been impaired. Also where separate fluxing is employed suitable precautions should be taken to keep the surface of the solder in the soldering bath clean. The use of the fluxing layer on the solder has definite advantages over separate fluxing. The flux layer serves the dual function of cleaning the parts to be soldered and keeping the solder bath clean. Furthermore, the passage of the parts directly from the flux to the solder avoids any possibility of dirtying the cleaned surfaces between fluxing and soldering.

The process, when used for assembly of elements, is not limited to soldering of terminals to a single conductive unit, e. g., the rectifier disc of Fig. 2. A plurality of units may be soldered into a unitary assembly in a similar manner. For example, the device of Fig. 2 might include a stack of several rectifier discs.

Although this invention has been disclosed by means of specific illustrative embodiments thereof, it will be understood that it is not limited thereby but by the appended claims only.

What is claimed is:

1. The method of assembling a conductive device comprising metallic conductive members and units having metallic conductive and non-metallic semiconductive portions that comprises protecting the semiconductive portions of the units from further processing, temporarily assembling a desired number of members and units, immersing the assembly in a first bath of a material that will penetrate the pores of said assembly without injury thereto, removing the assembly from said bath, immersing it in a second bath of a low melting point solder having a layer of weak fluxing material on its surface, and removing the assembly from the second bath when all the conductive portions thereof are coated with solder, said baths each being maintained at a temperature above the melting point of the solder and below a temperature high enough to cause injury to any element of the assembly.

2. The method of assembling a metal oxide-metal rectifier device by means of soft solder that comprises temporarily assembling the desired number of rectifier units and terminals, dipping the assembly into a bath of water for from one to three minutes, then immersing said assembly in a bath of soft solder through a layer of fluxing material consisting of approximately 1 per cent sulphuric acid and 99 per cent water, on the surface of the solder, until the metallic parts of the assembly are coated with solder, removing the assembly from the bath, washing it in cold water and drying it, the temperature of both baths being maintained between 60° and 100° C.

3. The method of soldering to a conductive device having conductive and semiconductive portions that comprises protecting the semiconductive portions from processing, immersing the device in a first bath of a material that will penetrate the pores of said device without injury thereto, removing the device from said bath, immersing it in a second bath of a low melting point solder having a layer of weak fluxing material on its surface, and removing the device from the second bath when all the conductive portions thereof are coated with solder, said baths each being maintained at a temperature above the melting point of the solder and below a temperature high enough to cause injury to the device.

4. The method of soldering to the metallic portions of a metal oxide-metal rectifier unit that comprises protecting the edges of the unit against processing, immersing the unit in a first bath comprising a liquid that will penetrate into the pores of the unit without damage thereto, removing the unit from said bath, immersing it in a second bath of low melting point molten solder covered by a layer of weak fluxing material, and removing the unit as soon as the metallic portions thereof are coated with solder, said baths each being maintained at a temperature above the melting point of the solder and below a temperature high enough to cause injury to the unit.

5. The method of soldering to the metallic portions of a cuprous oxide-copper rectifier unit having a front contact of adherent metal, that comprises masking the edge of the unit, immersing said unit in a bath of water maintained at a temperature of 60° to 100° C., removing the unit and immersing it in a bath of molten solder through a layer of water containing about 1 per cent of sulphuric acid, maintained on the surface of said solder, said layer and solder being at a temperature of 60° to 100° C., and removing from said second bath after said metallic portions of the unit have been coated with solder.

6. The method of soldering metallic terminals to the front and back contacts of a cuprous oxide-copper rectifier disc having a front contact of reduced copper, that comprises masking the edge of the disc against further processing, clamping the terminals respectively against the front and back contacts, immersing this assembly in water maintained at about the soldering temperature for from one to three minutes, removing the assembly from the water, immersing said assembly in a molten soft solder through a fluxing layer of 1 per cent sulphuric acid and 99 per cent water, and removing the assembly when all metallic parts thereof are coated with solder, the soldering temperature being below 100° C.

7. The method of soldering metallic terminals to the front and back contacts of a cuprous oxide-copper rectifier unit having a front contact of reduced copper that comprises masking the edges of the unit against further processing, clamping the terminals respectively against the front and back contacts, immersing this assembly in water maintained at about the soldering temperature for from one to three minutes, removing the assembly from the water, immersing said assembly in a molten soft solder through a fluxing layer of 1 per cent sulphuric acid in water, removing the assembly when all metallic parts thereof are coated with solder, washing the soldered assembly in cold water and drying it.

8. The method of soldering to the front and back contacts of a cuprous oxide-copper rectifier unit without impairing the electrical characteristics thereof, that comprises protecting the edges of the unit from further processing by means of a mask, inhibiting penetration of soldering flux into the unit by absorbing water into the pores thereof at approximately the soldering temperature, passing the unit through a flux of 1 per cent sulphuric acid in water also at approximately the soldering temperature, immersing the unit in a molten soft solder, and removing from the solder, the soldering temperature being below 100° C.

9. In a method of soldering to the adherent front contact of a cuprous oxide-copper rectifier by immersion in liquid, soft solder, the steps that comprise subjecting said contact to a fluid at about the soldering temperature, that will penetrate the pores thereof without injury to said rectifier, then subjecting said contact to a weak fluxing material also at about the soldering temperature and passing the contact directly into the liquid soft solder.

ROBERT A. EHRHARDT.
EDGAR E. WRIGHT.